(12) United States Patent
Li (10) Patent No.: US 12,032,976 B2
(45) Date of Patent: Jul. 9, 2024

(54) OPERATION METHOD AND APPARATUS

(71) Applicant: VIVO MOBILE COMMUNICATION CO., LTD., Guangdong (CN)

(72) Inventor: Shaogeng Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/187,057

(22) Filed: Mar. 21, 2023

(65) Prior Publication Data
US 2023/0236852 A1 Jul. 27, 2023

Related U.S. Application Data

(63) Continuation of application No. PCT/CN2021/118982, filed on Sep. 17, 2021.

(30) Foreign Application Priority Data

Sep. 21, 2020 (CN) .......................... 202010994746.4

(51) Int. Cl.
| | | |
|---|---|---|
| *G06F 9/451* | (2018.01) | |
| *G06F 3/0481* | (2022.01) | |
| *G06F 3/04842* | (2022.01) | |
| *G06F 3/0486* | (2013.01) | |
| *G06F 3/0488* | (2022.01) | |

(52) U.S. Cl.
CPC ............ *G06F 9/451* (2018.02); *G06F 3/0481* (2013.01); *G06F 3/04842* (2013.01);
(Continued)

(58) Field of Classification Search
CPC .... G06F 9/451; G06F 3/0481; G06F 3/04842; G06F 3/0486; G06F 3/0488
See application file for complete search history.

(56) References Cited

U.S. PATENT DOCUMENTS

| | | |
|---|---|---|
| 2007/0250936 A1 | 10/2007 | Nakamura et al. |
| 2010/0107123 A1 | 4/2010 | Sareen et al. |
| | (Continued) | |

FOREIGN PATENT DOCUMENTS

| | | |
|---|---|---|
| CN | 102197362 A | 9/2011 |
| CN | 102830969 A | 12/2012 |
| | (Continued) | |

OTHER PUBLICATIONS

Matthias Book, Volker Gruhn, An Instant Messaging Framework for Flexible Interaction with Rich Clients, Chair of Applied Telematics/e-Business, Dept. of Computer Science, University of Leipzig Klostergasse 3, 04109 Leipzig, Germany; {book, gruhn}@ebus.informatik.uni-leipzig.de, 2007.
(Continued)

*Primary Examiner* — Cao H Nguyen
(74) *Attorney, Agent, or Firm* — Price Heneveld, LLP (57) ABSTRACT

Provided is an operation method and apparatus. The method includes: receiving a first input in a case that a first interface is displayed, the first interface including N first controls, N being a positive integer; displaying a target window and at least one second control in response to the first input, the target window displaying interface display content of the first interface, the at least one second control and the N first controls having a mapping relationship, and each of the at least one second control being configured to trigger a function operation that is triggerable by a corresponding first control; receiving a second input by a user for a target control in the at least one second control; and executing a target operation corresponding to the target control in response to the second input.

12 Claims, 5 Drawing Sheets

(52) U.S. Cl.
CPC .......... *G06F 3/0486* (2013.01); *G06F 3/0488* (2013.01); *G06F 2203/04804* (2013.01)

(56) References Cited

U.S. PATENT DOCUMENTS

| | | | |
|---|---|---|---|
| 2016/0202852 A1 | 7/2016 | Park et al. | |
| 2017/0195613 A1* | 7/2017 | Yang | H04N 5/268 |
| 2017/0264854 A1 | 9/2017 | Fujii et al. | |
| 2017/0372678 A1 | 12/2017 | Ying | |
| 2020/0285439 A1 | 9/2020 | Chen et al. | |
| 2022/0269405 A1 | 8/2022 | Wu et al. | |

FOREIGN PATENT DOCUMENTS

| | | | |
|---|---|---|---|
| CN | 106873869 | * | 6/2017 |
| CN | 106873869 | A | 6/2017 |
| CN | 108228040 | A | 6/2018 |
| CN | 109814794 | A | 5/2019 |
| CN | 110489043 | A | 11/2019 |
| CN | 110737374 | A | 1/2020 |
| CN | 111026302 | A | 4/2020 |
| CN | 112162665 | A | 1/2021 |
| EP | 3985492 | A1 | 4/2022 |
| JP | H04284531 | A | 10/1992 |
| JP | 2005260289 | A | 9/2005 |
| JP | 2007293418 | A | 11/2007 |
| JP | 2010108088 | A | 5/2010 |
| JP | 2017163287 | A | 9/2017 |

OTHER PUBLICATIONS

Good Chatter—Microsoft instant messaging software MSN Messenger, CNKI, Apr. 30, 2002, pp. 52-53, China.

* cited by examiner

OPERATION METHOD AND APPARATUS

CROSS-REFERENCE TO RELATED APPLICATIONS

This application is a continuation application of International Application No. PCT/CN2021/118982 filed on Sep. 17, 2021, which claims priority to Chinese Patent Application No. 202010994746.4 filed in China on Sep. 21, 2020, which are incorporated herein by reference in their entireties.

TECHNICAL FIELD

Embodiments of this application relate to the field of communication technologies, and in particular, to an operation method and apparatus.

BACKGROUND

With the increase of the screen size of electronic devices and the continuous enrichment of system functions, different contents of different applications can be displayed on the same screen of an electronic device.

In the related art, a video can be played in a floating window on an electronic device while a chat interface of a social application is being displayed, so that a user can play the video while chatting with others.

However, due to a small display region of the floating window, only the video content can be displayed on the electronic device, and the user cannot directly operate function controls of the video, for example, pausing the video or switching a music that is being played.

SUMMARY

According to a first aspect, an embodiment of this application provides an operation method, including: receiving a first input in a case that a first interface is displayed, the first interface including N first controls, N being a positive integer; displaying a target window and at least one second control in response to the first input, the target window displaying interface display content of the first interface, the at least one second control and the N first controls having a mapping relationship, and each of the at least one second control being configured to trigger a function operation that is triggerable by a corresponding first control; receiving a second input by a user for a target control in the at least one second control; and executing a target operation corresponding to the target control in response to the second input.

According to a second aspect, an embodiment of this application provides an operation apparatus, including: a receiving module, a display module, and an execution module, where the receiving module is configured to receive a first input in a case that a first interface is displayed, the first interface including N first controls, N being a positive integer; the display module is configured to display a target window and at least one second control in response to the first input received by the receiving module, the target window displaying interface display content of the first interface, the at least one second control and the N first controls having a mapping relationship, and each of the at least one second control being configured to trigger a function operation that is triggerable by a corresponding first control; the receiving module is further configured to receive a first input by a user for a target control in the at least one second control displayed by the display module; and the execution module is configured to execute a target operation corresponding to the target control in response to the first input received by the receiving module.

According to a third aspect, an embodiment of this application provides an electronic device, including a processor, a memory, and a program or instructions that are stored in the memory and runnable on the processor, the program or instructions, when executed by the processor, implementing steps of the operation method according to the first aspect.

According to a fourth aspect, an embodiment of this application provides a readable storage medium, storing a program or instructions, the program or instructions, when executed by a processor, implementing steps of the method according to the first aspect.

According to a fifth aspect, an embodiment of this application provides a chip, including a processor and a communication interface, where the communication interface is coupled to the processor, and the processor is configured to run a program or instructions to implement the method according to the first aspect.

DETAILED DESCRIPTION

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without making creative efforts shall fall within the protection scope of this application.

In the specification and claims of this application, the terms "first", "second", and the like are intended to distinguish between similar objects but do not indicate a particular order or sequence. It is to be understood that the data termed in such a way are interchangeable in proper circumstances, so that the embodiments of this application described herein can be implemented in other orders than the order illustrated or described herein. In addition, the objects distinguished by "first" and "second" are usually of the same type, and a quantity of the objects is not limited. For example, there may be one or more first objects. Moreover, "and/or" used in this specification and the claims represents at least one of the connected objects, and the character "/" generally indicates an "or" relationship between the associated objects.

An operation method provided in the embodiments of this application is applicable in a scenario in which interface display content of an application is displayed in a floating window on an electronic device.

Figure 1:
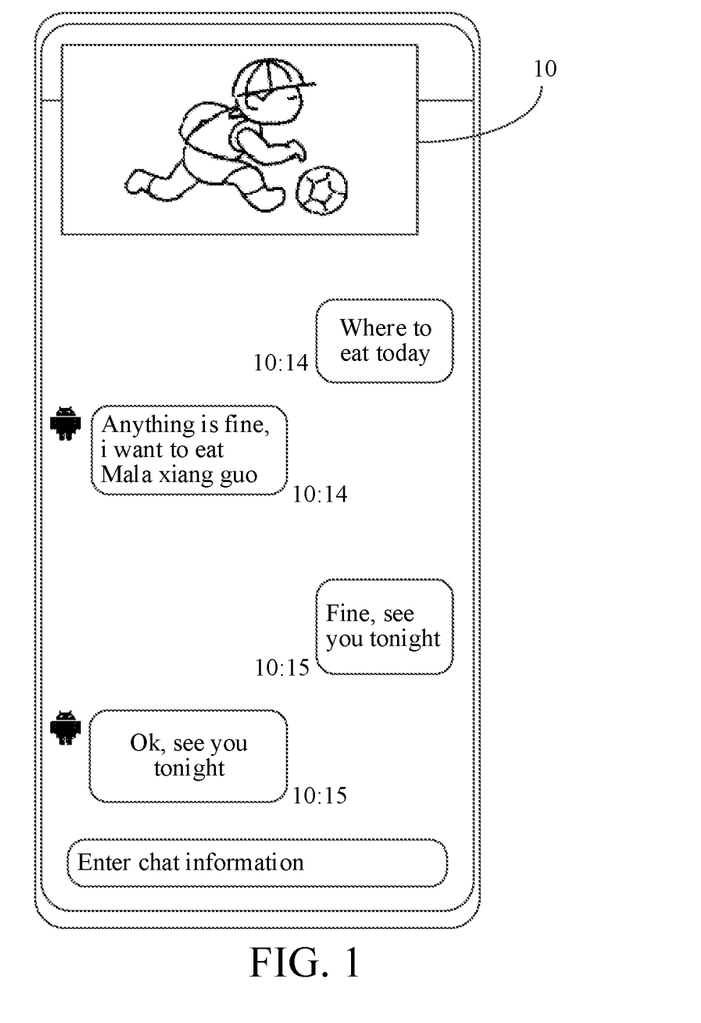
FIG. 1 is a schematic diagram of a display interface of a floating window according to an embodiment of this application.

For example, in a scenario in which interface display content of an application is displayed in a floating window on an electronic device, with the continuous enrichment of functions of the electronic device, in the related art, in order to facilitate the use of the electronic device by users and make full use of the functions of the electronic device, as shown in FIG. 1, a user has a chat while watching a game video on an electronic device, and video content being played on a video application is displayed in a floating window or a small window (for example, a floating window 10 in FIG. 1) on the electronic device. Different from the split-screen technology, the user cannot operate the application through the floating window or small window, for example, pausing the video content being played. In this way, when the user wants to pause the video content being played in the floating window, the user needs to click on/tap the floating window to switch back to the original interface of the video application to pause the video being played, which is cumbersome in operation.

To resolve this problem, in the technical solutions provided in the embodiments of this application, in a case that a first interface is displayed on an electronic device, a function button for a user to implement a quick operation or a combined function of multiple function buttons may be mapped through a setting function. When a floating window is displayed on the electronic device, mapping buttons are also displayed, so that the user clicks on/taps these mapping buttons to trigger the electronic device to execute corresponding functions. Therefore, the user does not need to click on/tap the floating window to display the original interface of the application to trigger these functions, which simplifies the operation.

The following describes an operation method provided in the embodiments of this application in detail through specific embodiments and application scenarios thereof with reference to the accompanying drawings.

Figure 2:
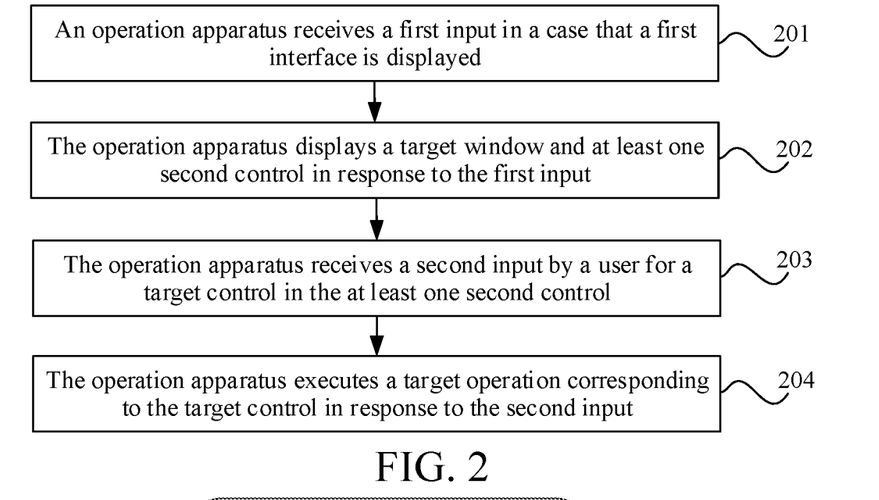
FIG. 2 is a schematic flowchart of an operation method according to an embodiment of this application.

As shown in FIG. 2, an embodiment of this application provides an operation method. The method may include the following step 201 to step 204.

Step 201. An operation apparatus receives a first input in a case that a first interface is displayed.

The first interface includes N first controls, N being a positive integer.

For example, the first interface may be an interface of a target application installed in an electronic device. The electronic device receives an input by a user for the N first controls in the first interface to trigger the target application to execute a corresponding operation.

For example, the first input may be an input by the user on a screen of the electronic device, or a speech instruction inputted by the user, or a specific gesture inputted by the user, and may be specifically determined according to an actual use requirement. This is not limited in the embodiments of the present invention. For example, the first input may be an input by the user to trigger the electronic device to display the first interface in a floating window.

Step 202. The operation apparatus displays a target window and at least one second control in response to the first input.

The target window displays interface display content of the first interface, the at least one second control and the N first controls have a mapping relationship, and each of the at least one second control is configured to trigger a function operation that is triggerable by a corresponding first control.

For example, in the related art, the electronic device displays only the target window (namely, the floating window or a small window); however, in the embodiments of this application, in addition to the target window, the electronic device also displays the at least one second control at a preset position of the target window. For example, the preset position may be below the target window.

It is to be noted that, when the target window displays the interface display content of the first interface, the user can view the interface display content of the first interface through the target window in real time, but cannot control the target application through the target window. For example, when the target application is a video application, the user can view video content being played in the video application through the target window, but cannot control the video application to pause the video being played.

For example, the at least one second control is a control that has a mapping relationship with the N first controls in the first interface. One second control has a mapping relationship with at least one first control. The mapping relationship is button mapping. That is, when the user clicks on/taps the second control, the electronic device can be triggered to execute a function operation that can be triggered by the at least one first control. When the mapping relationship is established between one second control and at least one first control, the second control is a mapping control of the at least one first control.

Figure 3:
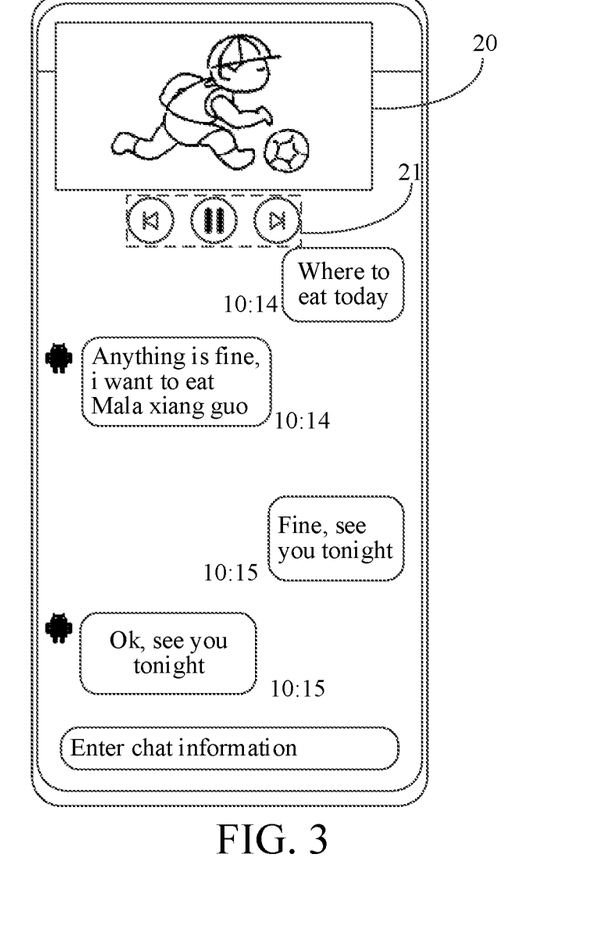
FIG. 3 is a schematic diagram 1 of an interface to which an operation method is applied according to an embodiment of this application.

For example, with reference to FIG. 1, as shown in FIG. 3, after the electronic device receives the first input by the user, in response to the first input, in addition to a floating window 20 (namely, the target window), the electronic device also displays, in a region 21, three mapping controls that have a mapping relationship with controls in the first interface.

Step 203. The operation apparatus receives a second input by a user for a target control in the at least one second control.

For example, the second input may be an input by the user to click on/tap, drag, long press, or short press the target control. A corresponding input action is performed on the target control according to a control type of the target control. For example, when the target control is a button control, the second input is an input by the user to click on/tap the target control; and when the target control is a progress bar control, the second input is an input by the user to drag the target control.

Step 204. The operation apparatus executes a target operation corresponding to the target control in response to the second input.

For example, after the electronic device receives the second input by the user for the target control, the electronic device executes the target operation in response to the second input. The target operation is an operation that can be triggered by the first control, in the first interface, that has a mapping relationship with the target control.

For example, as shown in FIG. 3, after the electronic device receives that the user clicks on/taps a pause control among the three mapping controls in the region 21, the electronic device sends a control instruction to the target application to control the target application to pause the video content being played.

It is to be noted that, the target application may be a video application, or may be an application that can be operated by using a touch control, such as a social application or a game application. The electronic device may not only perform button mapping on a control in the first interface of the target application, but also perform function mapping on a function of the target application.

For example, when the electronic device maps the function of the target application, the first interface includes N functions (for example, the functions may be implemented through various gesture operations, and these functions may or may not have corresponding controls in the first interface). The at least one second control and the N functions have a mapping relationship. Each of the at least one second control is configured to trigger a corresponding function in the N functions. The target operation is triggering a target function corresponding to the target control in the first interface. It is to be noted that, in the descriptions after this embodiment of this application, the controls in the first interface may be equivalently replaced with functions.

In this way, after a first input by a user for triggering the display of a target window is received, in response to the first input, in addition to the target window, at least one second control that has a mapping relationship with N first controls in a first interface is also displayed. In addition, after a second input by the user for a target control in the at least one second control is received, in response to the second input, a target operation corresponding to the target control is executed. As a result, when interface display content of an application is being displayed in a floating window on an electronic device, the user can control the application to execute some function operations by using function controls attached to the floating window.

Optionally, in this embodiment of this application, in order to enable the electronic device to display the mapping buttons (namely, the second controls) when displaying the floating window (namely, the target window), the electronic device needs to perform button mapping on the controls in the first interface.

For example, the first interface includes M controls, the M controls include the N first controls, M≥N, and M is a positive integer. That is, the N first controls are controls, in the M controls in the first interface, that have a mapping relationship established with the second controls. The first interface includes M controls; however, the electronic device only performs button mapping on N controls (namely, the N first controls).

For example, before displaying the target window and the at least one second control in step 202, the operation method provided in this embodiment of this application may further include the following step 202a1 and step 202a2.

Step 202a1. The operation apparatus receives a third input by the user for at least one control in the M controls in a case that the first interface is displayed.

Step 202a2. The operation apparatus determines the at least one control as the first control in response to the third input.

An operation that is triggerable by the at least one control includes: a function used in a case that the first interface is in a floating window display state.

For example, before step 202a1, the user may enter a setting interface by clicking on/tapping a function entry provided on the electronic device. The user may click on/tap one or more controls in the setting interface for button mapping.

For example, after the setting of button mapping is completed, the user may trigger the electronic device to display the target window through a specific gesture operation on the first interface.

It is to be noted that, when a plurality of controls in the M controls are button-mapped to one second control, after the user clicks on/taps the second control, the electronic device executes operations corresponding to the plurality of controls. For example, the user may map a pause control and an exit control of the video application to one mapping control. When the user clicks on/taps the mapping control, the electronic device may pause the video content being played in the video application and exit the video application.

Figure 4:
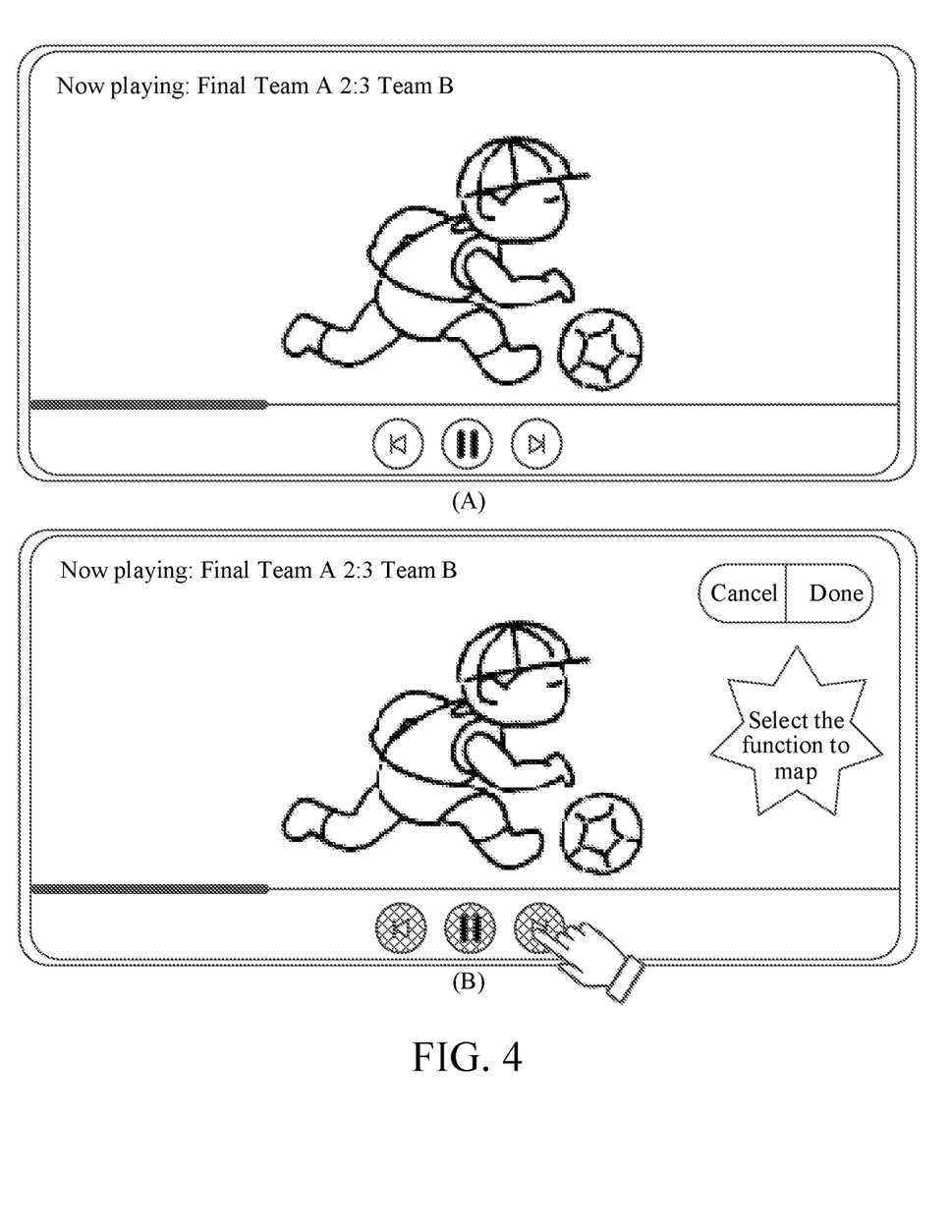
FIG. 4 is a schematic diagram 2 of an interface to which an operation method is applied according to an embodiment of this application.

For example, FIG. 4(A) shows a video playing interface (namely, the first interface) of a video application displayed on an electronic device. The first interface includes three controls (fast backward, pause, and fast forward). When the electronic device receives a specific input by the user and displays a setting interface for button mapping (as shown in FIG. 4(B)), the user may select at least one control from the three controls to perform button mapping thereon. When the user wants to uncheck a control, the selection on the control may be canceled by double-clicking on/tapping the control. After the setting is completed, the user may click on/tap a "done" control, and then the electronic device establishes a button mapping relationship. If there is no control, in the first interface, that can be used for a button mapping operation, the electronic device displays a prompt message "no operable item in the interface".

In this way, the user may perform button mapping on function buttons in the first interface of the application in the form of a single function or a combination of functions according to his/her own habits and preferences, so that the user can control the application by clicking on/tapping the mapping buttons when the first interface is displayed in the floating window on the electronic device.

Further optionally, in this embodiment of this application, in order to prevent the interface content from changing when the user sets button mapping, the first interface may be locked.

For example, before step 202a1, the operation method provided in this embodiment of this application may further include the following step 202b1 and step 202b2.

Step 202b1. The operation apparatus receives a fourth input in a case that the first interface is displayed.

Step 202b2. The operation apparatus displays a second interface based on a preset transparency in response to the fourth input.

The second interface includes an interface image of the first interface. The third input is an input by the user for a target region in the second interface. The target region is a region corresponding to the at least one control in the interface image of the first interface.

For example, the electronic device displays the second interface based on the preset transparency, and the second interface displays a static image of the first interface, to avoid setting failure arising from the change of the interface content of the first interface when the user sets button mapping.

In this way, the first interface on the electronic device may be locked when the user sets button mapping to avoid user misoperation due to the change of the interface content.

Further optionally, in this embodiment of this application, after the user completes the setting of button mapping, the electronic device may unlock the first interface.

For example, after step 202b2, the operation method provided in this embodiment of this application may further include the following step 202b3.

Step 202b3. The operation apparatus cancels the display of the second interface.

For example, after the electronic device completes the setting of button mapping, the electronic device cancels the display of the second interface and updates the interface display content of the first interface.

In this way, the electronic device may unlock the first interface after the user completes the setting of button mapping, so that the first interface returns to normal.

Optionally, in this embodiment of this application, after the electronic device displays the target window and the at least one second control, the user may change a display position of the target window through a drag operation. In order to keep the interface layout clean, the second control may move as the target window moves when the user drags the target window to move.

For example, after step 202, the operation method provided in this embodiment of this application may further include the following step 202c1 and step 202c2.

Step 202c1. The operation apparatus receives a fifth input by the user for dragging the target window.

Step 202c2. The operation apparatus updates, in response to the fifth input, display positions of displaying the target window and the at least one second control according to a movement track corresponding to the fifth input.

A display position of the at least one second control moves as the target window moves.

For example, during the moving process, a relative positional relationship between the target window and the at least one second control remains unchanged. That is, the at least one second control is always located at a preset position of the target window.

In this way, when the user drags the target window to move, the second control may move as the target window moves, thereby ensuring the cleanliness and integrity of the interface layout.

By the operation method provided in the embodiments of this application, the electronic device may, after receiving a third input by a user for at least one control in M controls in a first interface, perform button mapping on the at least one control, and after receiving a first input by the user for triggering the display of a target window, in response to the first input, in addition to the target window, also display at least one second control that has a mapping relationship with N first controls (namely, the at least one control) in the first interface. In addition, after a second input by the user for a target control in the at least one second control is received, in response to the second input, a target operation corresponding to the target control is executed. As a result, when interface display content of an application is being displayed in a floating window on an electronic device, the user can control the application to execute some operations by using function controls attached to the floating window.

It is to be noted that, the operation method provided in the embodiments of this application may be performed by an operation apparatus or a control module in the operation apparatus for performing the operation method. In an embodiment of this application, an operation apparatus performing the operation method is used as an example to describe the operation apparatus provided in the embodiments of this application.

It is to be noted that, in the embodiments of this application, each operation method shown in the above method accompanying drawings is exemplarily described with reference to one accompanying drawing in the embodiments of this application. During specific implementation, each operation method shown in the above method accompanying drawings may be further implemented with reference to any other combinable accompanying drawings schematically described in the above embodiments, and details are not described herein again.

Figure 5:
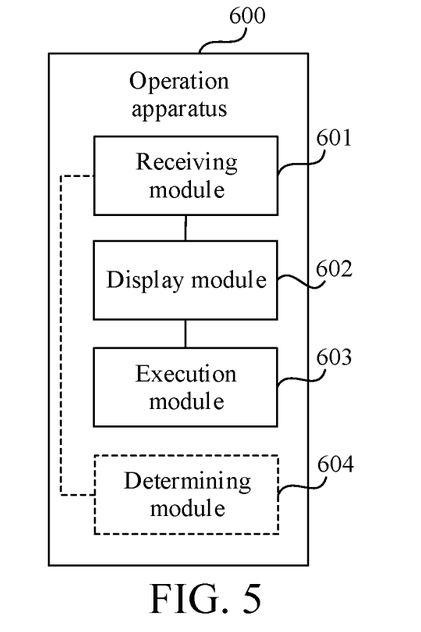
FIG. 5 is a schematic structural diagram of an operation apparatus according to an embodiment of this application.

FIG. 5 is a schematic diagram of a possible structure of an operation apparatus according to an embodiment of this application. As shown in FIG. 5, the operation apparatus 600 includes: a receiving module 601, a display module 602, and an execution module 603. The receiving module 601 is configured to receive a first input in a case that a first interface is displayed, the first interface including N first controls, N being a positive integer. The display module 602 is configured to display a target window and at least one second control in response to the first input received by the receiving module 601, the target window displaying interface display content of the first interface, the at least one second control and the N first controls having a mapping relationship, and each of the at least one second control being configured to trigger a function operation that is triggerable by a corresponding first control. The receiving module 601 is further configured to receive a first input by a user for a target control in the at least one second control displayed by the display module 602. The execution module 603 is configured to execute a target operation corresponding to the target control in response to the first input received by the receiving module 601.

Optionally, as shown in FIG. 5, the operation apparatus 600 further includes: a determining module 604. The first interface includes M controls, the M controls include the N first controls, M≥N, and M is a positive integer. The receiving module 601 is further configured to receive a third input by the user for at least one control in the M controls in a case that the first interface is displayed. The determining module 604 is configured to determine the at least one control as the first control in response to the third input received by the receiving module 601. An operation that is triggerable by the at least one control includes: a function used in a case that the first interface is in a floating window display state.

Optionally, the receiving module 601 is further configured to receive a fourth input in a case that the first interface is displayed; the display module 602 is further configured to display a second interface based on a preset transparency in response to the fourth input received by the receiving module 601; the second interface includes an interface image of the first interface; the third input is an input by the user for a target region in the second interface; and the target region is a region corresponding to the at least one control in the interface image of the first interface.

Optionally, the display module 602 is further configured to cancel the display of the second interface.

Optionally, the receiving module 601 is further configured to receive a fifth input by the user for dragging the target window; and the display module 602 updates, in response to the fifth input received by the receiving module 601, display positions of displaying the target window and the at least one second control according to a movement track corresponding to the fifth input, a display position of the at least one second control moving as the target window moves.

It is to be noted that, as shown in FIG. 5, a module necessarily included in the operation apparatus 600 is shown in a solid-line box, such as the receiving module 601, the display module 602, and the execution module 603; and a module that may or may not be included in the operation apparatus 600 is shown in a dashed-line box, such as the determining module 604.

In the embodiments of this application, the operation apparatus may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a handheld computer, an in-vehicle electronic device, a wearable device, an ultra-mobile personal computer (UMPC), a netbook, a personal digital assistant (PDA), or the like; and the non-mobile electronic device may be a server, a network attached storage (NAS), a personal computer (PC), a television (TV), a teller machine, a self-service machine, or the like. This is not specifically limited in the embodiments of this application.

The operation apparatus in the embodiments of this application may be an apparatus with an operating system. The operating system may be an Android operating system, may be an iOS operating system, or may be another possible operating system. This is not specifically limited in the embodiments of this application.

The operation apparatus provided in the embodiments of this application can implement all processes performed in the method embodiments in FIG. 2 to FIG. 4. To avoid repetition, details are not described herein again.

By using the operation apparatus provided in the embodiments of this application, the electronic device may, after receiving a third input by a user for at least one control in M controls in a first interface, perform button mapping on the at least one control, and after receiving a first input by the user for triggering the display of a target window, in response to the first input, in addition to the target window, also display at least one second control that has a mapping relationship with N first controls (namely, the at least one control) in the first interface. In addition, after a second input by the user for a target control in the at least one second control is received, in response to the second input, a target operation corresponding to the target control is executed. As a result, when interface display content of an application is being displayed in a floating window on an electronic device, the user can control the application to execute some function operations by using function controls attached to the floating window.

Figure 6:
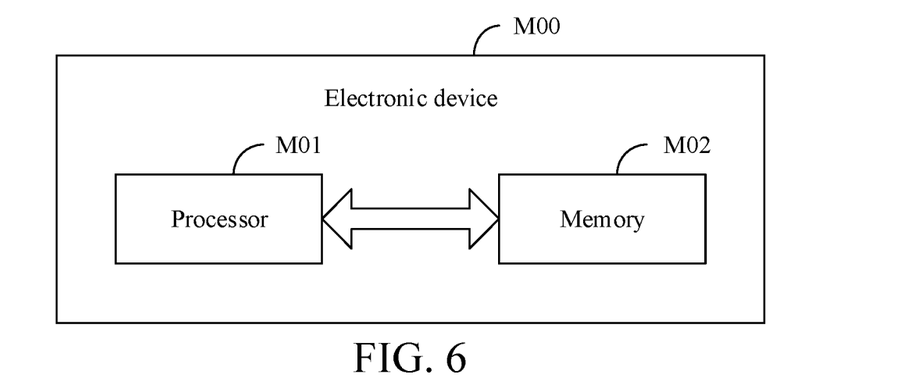
FIG. 6 is a schematic structural diagram 1 of an electronic device according to an embodiment of this application.

Optionally, as shown in FIG. 6, an embodiment of this application further provides an electronic device M00, including a processor M01, a memory M02, and a program or instructions that are stored in the memory M02 and runnable on the processor M01. The program or instructions, when executed by the processor M01, implement the processes of the embodiments of the operation method, and can achieve the same technical effects. To avoid repetition, details are not described herein again.

It is to be noted that the electronic device in the embodiments of this application includes the mobile electronic device and the non-mobile electronic device.

Figure 7:
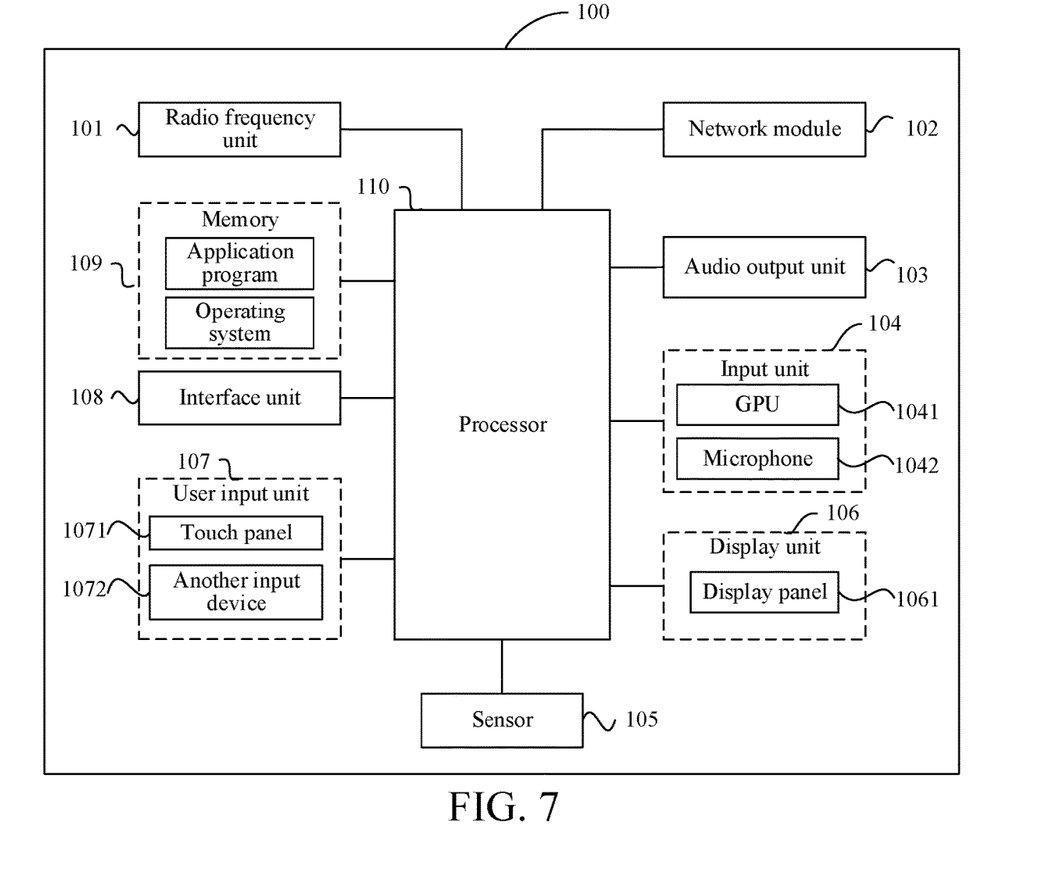
FIG. 7 is a schematic structural diagram 2 of an electronic device according to an embodiment of this application.

FIG. 7 is a schematic diagram of a hardware structure of an electronic device for implementing the embodiments of this application.

The electronic device 100 includes, but is not limited to: components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may also include a power supply (such as a battery) for supplying power to the components. The power supply may be logically connected to the processor 110 by a power management system, thereby achieving such functions as charging, discharging, and power consumption management by using the power management system. The structure of the electronic device shown in FIG. 7 constitutes no limitation on the electronic device, and the electronic device may include more or fewer components than those shown in the figure, or some components may be combined, or a different component deployment may be used. Details are not described herein.

The user input unit 107 is configured to receive a first input in a case that a first interface is displayed, the first interface including N first controls, N being a positive integer. The display unit 106 is configured to display a target window and at least one second control in response to the first input received by the user input unit 107, the target window displaying interface display content of the first interface, the at least one second control and the N first controls having a mapping relationship, and each of the at least one second control being configured to trigger a function operation that is triggerable by a corresponding first control. The user input unit 107 is further configured to receive a first input by a user for a target control in the at least one second control displayed by the display unit 106. The processor 110 is configured to execute a target operation corresponding to the target control in response to the first input received by the user input unit 107.

In this way, after a first input by a user for triggering the display of a target window is received, in response to the first input, in addition to the target window, at least one second control that has a mapping relationship with N first controls in a first interface is also displayed. In addition, after a second input by the user for a target control in the at least one second control is received, in response to the second input, a target operation corresponding to the target control is executed. As a result, when interface display content of an application is being displayed in a floating window on an electronic device, the user can control the application to execute some function operations by using function controls attached to the floating window.

Optionally, the first interface includes M controls, the M controls include the N first controls, M≥N, and M is a positive integer; the user input unit 107 is further configured to receive a third input by the user for at least one control in the M controls in a case that the first interface is displayed; and the processor 110 is configured to determine the at least one control as the first control in response to the third input received by the user input unit 107, an operation that is triggerable by the at least one control including: a function used in a case that the first interface is in a floating window display state.

In this way, the user may perform button mapping on function buttons in the first interface of the application in the form of a single function or a combination of functions according to his/her own habits and preferences, so that the user can control the application by clicking on/tapping the mapping buttons when the first interface is displayed in the floating window on the electronic device.

Optionally, the user input unit 107 is further configured to receive a fourth input in a case that the first interface is displayed; the display unit 106 is further configured to display a second interface based on a preset transparency in response to the fourth input received by the user input unit 107; the second interface includes an interface image of the first interface; the third input is an input by the user for a target region in the second interface; and the target region is a region corresponding to the at least one control in the interface image of the first interface.

In this way, the first interface on the electronic device may be locked when the user sets button mapping to avoid user misoperation due to the change of the interface content.

Optionally, the display unit 106 is further configured to cancel the display of the second interface.

In this way, the electronic device may unlock the first interface after the user completes the setting of button mapping, so that the first interface returns to normal.

Optionally, the user input unit 107 is further configured to receive a fifth input by the user for dragging the target window; and the display unit 106 updates, in response to the fifth input received by the user input unit 107, display positions of displaying the target window and the at least one second control according to a movement track corresponding to the fifth input, a display position of the at least one second control moving as the target window moves.

In this way, when the user drags the target window to move, the second control may move as the target window moves, thereby ensuring the cleanliness and integrity of the interface layout.

By using the electronic device provided in the embodiments of this application, the electronic device may, after receiving a third input by a user for at least one control in M controls in a first interface, perform button mapping on the at least one control, and after receiving a first input by the user for triggering the display of a target window, in response to the first input, in addition to the target window, also display at least one second control that has a mapping relationship with N first controls (namely, the at least one control) in the first interface. In addition, after a second input by the user for a target control in the at least one second control is received, in response to the second input, a target operation corresponding to the target control is executed. As a result, when interface display content of an application is being displayed in a floating window on an electronic device, the user can control the application to execute some operations by using function controls attached to the floating window.

It should be understood that in the embodiments of this application, the input unit 104 may include a graphics processing unit (GPU) 1041 and a microphone 1042. The graphics processing unit 1041 performs processing on image data of a static picture or a video that is obtained by an image acquisition apparatus (for example, a camera) in a video acquisition mode or an image acquisition mode. The display unit 106 may include a display panel 1061. The display panel 1061 may be configured in a form of a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional key (such as a volume control key or a switch key), a track ball, a mouse, and a joystick. Details are not described herein. The memory 109 may be configured to store a software program and various data, including but not limited to an application program and an operating system. The processor 110 may integrate an application processor and a modem processor, where the application processor mainly processes an operating system, a user interface, an application program, and the like, and the modem processor mainly processes wireless communication. It may be understood that the above modem processor may not be integrated into the processor 110.

An embodiment of this application further provides a readable storage medium, storing a program or instructions. The program or instructions, when executed by a processor, implement the processes of the embodiments of the operation method, and can achieve the same technical effects. To avoid repetition, details are not described herein again.

The processor is a processor in the electronic device in the above embodiments. The readable storage medium includes a computer-readable storage medium, such as a computer read-only memory (ROM), a random access memory (RAM), a magnetic disk, or an optical disc.

An embodiment of this application provides a chip, including a processor and a communication interface. The communication interface is coupled to the processor. The processor is configured to run a program or instructions to implement the processes of the embodiments of the operation method, and can achieve the same technical effects. To avoid repetition, details are not described herein again.

It should be understood that, the chip mentioned in the embodiments of this application may also be referred to as a system-level chip, a system chip, a chip system, a system on chip, or the like.

It is to be noted that, the terms "include", "comprise", or any other variation thereof in this specification is intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses. In addition, it is to be noted that the scopes of the method and apparatus in the implementations of this application are not limited to implementing functions in an order shown or discussed, and may further include implementing functions in a substantially simultaneous manner or in a reverse order according to the functions involved. For example, the described method may be performed in an order different from that described, and various steps may also be added, omitted, or combined. Moreover, features described according to some examples may also be combined in other examples.

Through the descriptions of the above implementations, a person skilled in the art may clearly understand that the method according to the above embodiments may be implemented by using software and a necessary general hardware platform, and certainly, may alternatively be implemented by hardware, but in many cases, the former manner is a better implementation. Based on such an understanding, the technical solutions of this application essentially or the part contributing to the existing technologies may be implemented in the form of a software product. The computer software product is stored in a storage medium (such as a ROM/RAM, a magnetic disk, or an optical disc), and includes several instructions to enable an electronic device (which may be a mobile phone, a computer, a server, an air conditioner, a network device, or the like) to perform the method described in the embodiments of this application.

The embodiments of this application have been described above with reference to the accompanying drawings. This application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall fall within the protection scope of this application.

What is claimed is:

1. An operation method, comprising:
in a case that a first interface is displayed, receiving a third input by the user for N controls of M controls in the first interface; wherein M and N are each a positive integer, M≥N;
determining the N controls as first controls in response to the third input, wherein an operation that is triggerable by each first control comprises: a function used in a case that the first interface is in a floating window display state;
receiving a first input;
displaying a target window and at least one second control in response to the first input, the target window displaying interface display content of the first interface, the at least one second control and N first controls having a mapping relationship, and each of the at least one second control being configured to trigger a function operation that is triggerable by a corresponding first control;
receiving a second input by a user for a target control in the at least one second control; and
executing a target operation corresponding to the target control in response to the second input.

2. The method according to claim 1, wherein before the receiving a third input by the user for at least one control in the M controls, the method further comprises:
receiving a fourth input in a case that the first interface is displayed; and
displaying a second interface based on a preset transparency in response to the fourth input, the second interface comprising an interface image of the first interface; and
the third input is an input by the user for a target region in the second interface, the target region being a region corresponding to the at least one control in the interface image of the first interface.

3. The method according to claim 2, wherein after the displaying a second interface based on a preset transparency in response to the fourth input, the method further comprises:
canceling the display of the second interface.

4. The method according to claim 1, wherein after the displaying a target window and at least one second control, the method further comprises:
receiving a fifth input by the user for dragging the target window; and
updating, in response to the fifth input, display positions of displaying the target window and the at least one second control according to a movement track corresponding to the fifth input,
a display position of the at least one second control moving as the target window moves.

5. An electronic device, comprising a processor, a memory, and a program or instructions that are stored in the memory and runnable on the processor, the program or instructions, when executed by the processor, implementing steps of an operation method, comprising:
in a case that a first interface is displayed, receiving a third input by the user for N controls of M controls in the first interface; wherein M and N are each a positive integer, M≥N;
determining the N controls as first controls in response to the third input, wherein an operation that is triggerable by each first control comprises: a function used in a case that the first interface is in a floating window display state;
receiving a first input;
displaying a target window and at least one second control in response to the first input, the target window displaying interface display content of the first interface, the at least one second control and N first controls having a mapping relationship, and each of the at least one second control being configured to trigger a function operation that is triggerable by a corresponding first control;
receiving a second input by a user for a target control in the at least one second control; and
executing a target operation corresponding to the target control in response to the second input.

6. The electronic device according to claim 5, wherein before the receiving a third input by the user for at least one control in the M controls, the method further comprises:
receiving a fourth input in a case that the first interface is displayed; and
displaying a second interface based on a preset transparency in response to the fourth input, the second interface comprising an interface image of the first interface; and
the third input is an input by the user for a target region in the second interface, the target region being a region corresponding to the at least one control in the interface image of the first interface.

7. The electronic device according to claim 6, wherein after the displaying a second interface based on a preset transparency in response to the fourth input, the method further comprises:
canceling the display of the second interface.

8. The electronic device according to claim 5, wherein after the displaying a target window and at least one second control, the method further comprises:
receiving a fifth input by the user for dragging the target window; and
updating, in response to the fifth input, display positions of displaying the target window and the at least one second control according to a movement track corresponding to the fifth input,
a display position of the at least one second control moving as the target window moves.

9. A non-transitory readable storage medium, storing a program or instructions, the program or instructions, when executed by a processor, implementing steps of an operation method, comprising:
in a case that a first interface is displayed, receiving a third input by the user for N controls of M controls in the first interface; wherein M and N are each a positive integer, M≥N;
determining the N controls as first controls in response to the third input, wherein an operation that is triggerable by each first control comprises: a function used in a case that the first interface is in a floating window display state;
receiving a first input;
displaying a target window and at least one second control in response to the first input, the target window displaying interface display content of the first interface, the at least one second control and N first controls having a mapping relationship, and each of the at least one second control being configured to trigger a function operation that is triggerable by a corresponding first control;
receiving a second input by a user for a target control in the at least one second control; and executing a target operation corresponding to the target control in response to the second input.

10. The non-transitory readable storage medium according to claim 9, wherein before the receiving a third input by the user for at least one control in the M controls, the method further comprises:
  receiving a fourth input in a case that the first interface is displayed; and
  displaying a second interface based on a preset transparency in response to the fourth input, the second interface comprising an interface image of the first interface; and
  the third input is an input by the user for a target region in the second interface, the target region being a region corresponding to the at least one control in the interface image of the first interface.

11. The non-transitory readable storage medium according to claim 10, wherein after the displaying a second interface based on a preset transparency in response to the fourth input, the method further comprises:
  canceling the display of the second interface.

12. The non-transitory readable storage medium according to claim 9, wherein after the displaying a target window and at least one second control, the method further comprises:
  receiving a fifth input by the user for dragging the target window; and
  updating, in response to the fifth input, display positions of displaying the target window and the at least one second control according to a movement track corresponding to the fifth input,
  a display position of the at least one second control moving as the target window moves.

* * * * *